Nov. 17, 1970  F. J. LYDEN  3,540,276
LIQUID LEVEL GAUGE
Filed Sept. 27, 1968
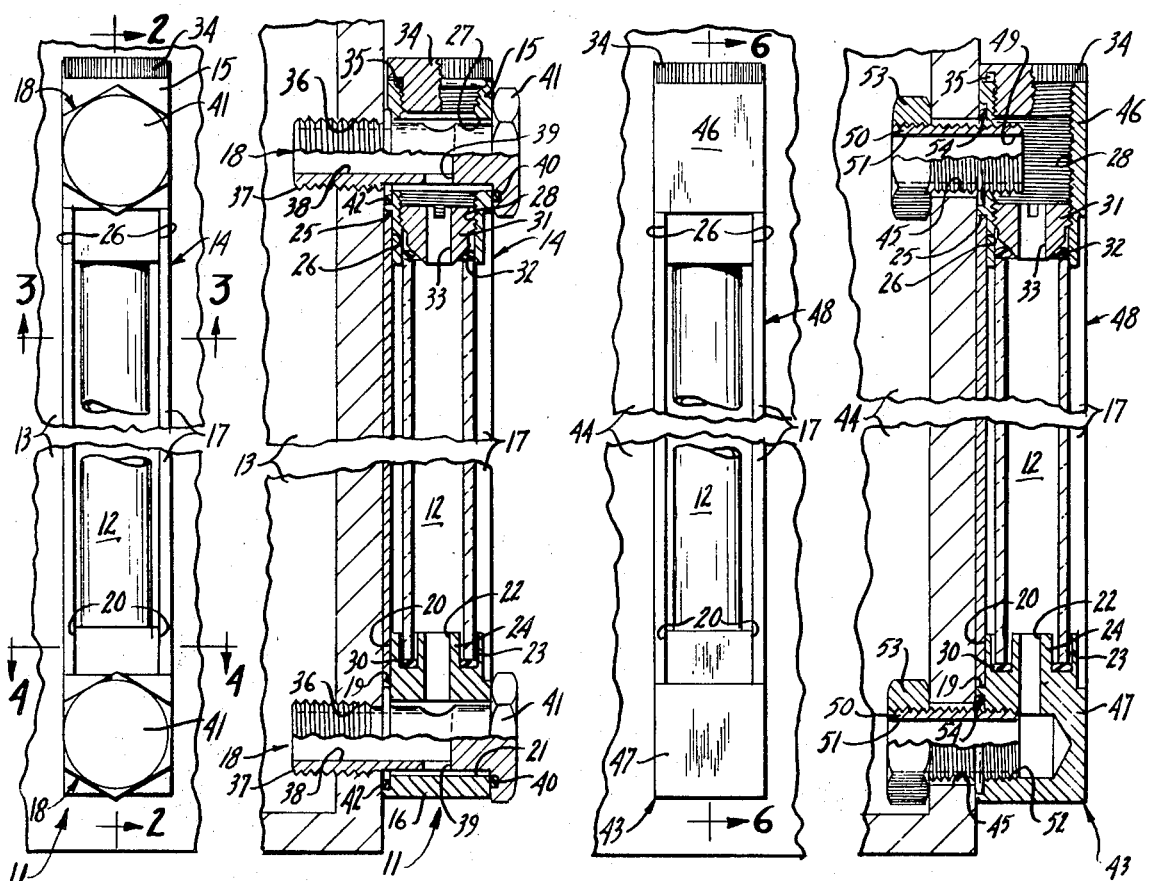
FIG_1  FIG_2  FIG_5  FIG_6
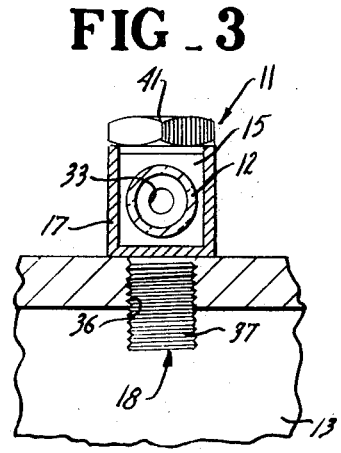
FIG_3
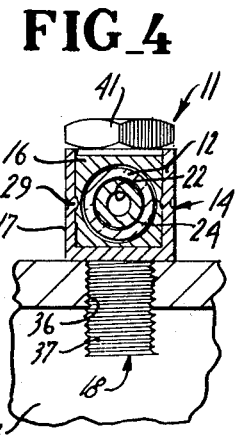
FIG_4
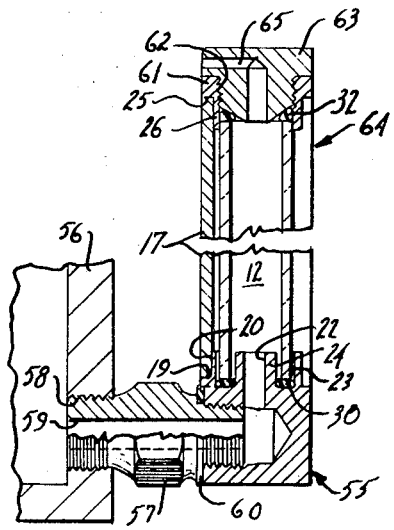
FIG_7
INVENTOR.
FRANK J. LYDEN
BY
Andrus, Sceales, Starke & Sawall
Attorneys

United States Patent Office 3,540,276
Patented Nov. 17, 1970

3,540,276
LIQUID LEVEL GAUGE
Frank J. Lyden, Manitowoc, Wis., assignor to Oil-Rite Corporation, Manitowoc, Wis., a corporation of Wisconsin
Filed Sept. 27, 1968, Ser. No. 763,162
Int. Cl. G01f *23/02*
U.S. Cl. 73—328                                     6 Claims

ABSTRACT OF THE DISCLOSURE

The liquid level gauge includes a guard or shield enclosure for the sight glass comprising a pair of aligned hollow end members vertically spaced from each other. A channel-shaped member extends between the end members and the respective end members have a portion thereof disposed in the corresponding end portion of the channel recess and are secured therein. Fastening means are provided for mounting the gauge onto a container and placing the container contents in communication with at least one of the end members and consequently with the sight glass.

---

This invention relates to a gauge for indicating the liquid level in a container or tank.

The manufacture of liquid level gauges of the general type here under consideration heretofore involved certain processes which were relatively expensive, thereby placing the product at a competitive disadvantage. It is generally an object of this invention to provide a liquid level gauge wherein the component parts can be produced by less expensive manufacturing processes and assembled with relative ease.

According to the invention, the liquid level gauge comprises a pair of vertically spaced and aligned hollow end members. A channel-shaped member extends between the end members with the respective end members having a portion thereof disposed in the corresponding end portion of the channel recess. The respective end members are secured to the channel-shaped member to form an integral sight glass enclosure. The tubular sight glass is disposed in the channel recess between the end members and communicates with the respective end members. The gauge structure further includes means for mounting the gauge onto a container and placing the container contents in communication with at least one of the end members and consequently with the sight glass.

The drawings furnished herewith illustrate the best mode presently contemplated for the invention and described hereinafter.

In the drawings:

FIG. 1 is a front elevation of a liquid level gauge in accordance with this invention with the gauge adapted for mounting on a tank provided with tapped or threaded holes for receiving the gauge mounting means;

FIG. 2 is a sectional view taken generally on line 2—2 of FIG. 1;

FIG. 3 is a sectional view taken generally on line 3—3 of FIG. 1;

FIG. 4 is a sectional view taken generally on line 4—4 of FIG. 1;

FIG. 5 is a front elevational view of a gauge generally similar to that of FIG. 1, but which is adapted for mounting on a tank provided with drilled holes to receive the gauge mounting means;

FIG. 6 is a sectional view taken generally on line 6—6 of FIG. 5; and

FIG. 7 is a sectional side elevation showing a further embodiment of the invention.

Referring to the drawings, the liquid level gauge 11 of FIGS. 1–4 includes a vertically disposed tubular sight glass 12 placed in communication with a container or tank 13 for containing a liquid and is adapted to indicate the level of the liquid in the tank within the range of the gauge. The tubular sight glass 12 is housed within a guard or shield enclosure or gauge body 14 for protection.

The guard or shield enclosure 14 of gauge 11 comprises vertically spaced and opposed end members 15 and 16 connected by the intermediate channel-shaped member 17. The end members 15 and 16 are screw machine parts and comprise fluid communication links or passage means between the tank mounting means 18 and tank 13 on the one hand and the sight glass 12.

The lower end member 16 is generally rectangular in section and is stepped or offset inwardly on at least the opposed sides and rear adjacent to the upper end thereof, for reasons which will later become apparent, to provide an upwardly facing shoulder 19 and offset surfaces 20 defining an upwardly extending portion of reduced section. Beneath the shoulder 19, the end member 16 is provided with a generally horizontal fore-and-aft extending through bore 21 for receiving the tank mounting means 18. A vertically extending bore 22 generally centrally of end member 16 communicates with the through bore 21 and opens upwardly from the upper face of the end member. The end member 16 further includes an annular recess 23 in the upper face thereof spaced outwardly from bore 22 to form a nipple 24 which projects upwardly into the sight glass 12 adapted to seat into the recess.

The upper end member 15 is generally rectangular in section having generally similar outer dimensions as those of end member 16 with which it is aligned in assembled relation. The lower end of end member 15 is stepped or offset inwardly on at least the opposed sides and rear thereof generally similar to end member 16 to provide a downwardly facing shoulder 25 opposed to shoulder 19 and offset surfaces 26 generally aligned with the surfaces 20. Thus, the upper end member 15 includes a downwardly extending portion of reduced section.

Above shoulder 25, the upper end member 15 is provided with a generally horizontal fore-and-aft through bore 27 for receiving the upper tank mounting means 18. The threaded vertical bore 28 of member 15 intercepts the through bore 27 and extends fully through the member to provide for assembly passage of the sight glass 12.

The channel member 17 of the guard enclosure 14 extends between the end members 15 and 16 with the open face of the channel member disposed forwardly to expose the sight glass 12 to view. The width of the channel recess of channel-shaped member 17 corresponds generally to that of the end member portions of reduced section and such reduced portions are disposed within the corresponding end portions of the channel recess with the extreme ends of the channel-shaped member abutting on the corresponding shoulders 19 and 25. The thickness of the flanges and web of channel-shaped member 17 corresponds generally to the depth of the shoulders 25 and 19 such that in the assembled relation of the respective end members 15 and 16 to channel-shaped member 17, the outer opposed sides and rear surfaces of the guard enclosure 14 are generally flush or form a generally continuous surface. Spot welds 29 or other suitable bonding means secure the channel-shaped member 17 to the corresponding offset surfaces 26 and 20 of the respective end members 15 and 16 to form an integral guard enclosure unit 14 for protection of the sight glass 12.

In the assembly of the gauge 11, the sight glass 12 is inserted through the vertical bore 28 of end member 15 and the lower end thereof is seated on a suitable annular sealing member 30 in the recess 23 of the lower end member 16 with the nipple 24 projecting upwardly into the sight glass. When properly seated in recess 23 of the lower end member 16, the sight glass 12 extends upwardly into the bore 28 of the upper end member 15 and is secured by the screw plug 31 threaded into bore 28. An annular sealing member 32 at the upper end of the sight glass 12 is compressed by the screw plug 31 to prevent leakage at that location. A vertical bore 33 in the screw plug 31 provides communication between the through bore 27 in member 15 and the sight glass 12. The upper end of the vertical bore 28 in end member 15 is closed by a threaded cap member 34 which compresses an annular sealing member 35 to seal the upper end of gauge 11.

The gauge 11 of FIGS. 1–4 is adapted for use with a tank 13 having vertically spaced tapped or threaded holes 36 generally aligned with the respective fore-and-aft through bores 27 and 21 of end members 15 and 16 making access to the interior of the tank unnecessary for installation of the gauge. Mounting means or headed bolts 18 extend through the respective fore-and-aft bores 27 and 21 of end members 15 and 16 and threadedly engage within the holes 36 of the tank 13 to draw the rear of the gauge up tight against the tank and secure the gauge 11 in place. The shank portions 37 of bolts 18 are hollow to provide a bore 38 which communicates with a cross bore 39 opening into the respective through bores 27 and 21 of end members 15 and 16. Thus, the sight glass 12 communicates with the tank 13 through the respective bores 33, 27, 39 and 38 at the upper end of the gauge and the bores 22, 21, 39, and 38 at the lower end of the gauge and is therefore adapted to reflect the level of the liquid content in the tank within the range of the gauge. The outer or forward end of the respective bores 27 and 21 of end members 15 and 16 are sealed by suitable annular sealing members 40 which may be recessed in part in the heads 41 of the mounting bolts 18, as shown, while the inner end of the bores 27 and 21 are sealed by suitable annular seals 42 which may be recessed in part in the rear face of the respective end members 15 and 16, as shown.

In the embodiment of FIGS. 5 and 6, the liquid level gauge 43 is adapted for use on a tank 44 provided with a pair of vertically spaced drilled holes 45 making access to the interior of the tank necessary for installation of the gauge. The gauge 43 includes the vertically spaced end members 46 and 47. Similarly, as in FIGS. 1–4, the end members 46 and 47 are connected by a channel member 17 to form an integral guard enclosure 48. The sight glass 12 is similarly installed in the guard enclosure 48 between the annular recess 23 of lower end member 47 and screw plug 31 engaged in the upper end member 46 as was the case with guard enclosure 14 of FIGS. 1–4. And a cap member 34 similarly closes the upper end of the vertical bore 28 in end member 46 as was done with respect to end member 15 of FIGS. 1–4.

In the guard enclosure 48, the upper end member 46 is provided with a threaded horizontal bore 49 which communicates with the vertical bore 28 and opens rearwardly and is adapted to threadedly receive the hollow threaded mounting stud 50 having a through bore 51. The lower end member 47 is provided with the threaded horizontal bore 52 which communicates with the vertical bore 22 and opens rearwardly for also receiving a hollow mounting stud 50. The bore openings 49 and 52 and corresponding mounting studs 50 are generally aligned with the drilled holes 45 provided in the tank 44.

In the installation of the gauge 43 onto the tank 44, the respective mounting studs 50 project through the corresponding holes 45 in the tank and receive the nuts 53 interiorly of the tank to draw the rear of the gauge up tight against the tank and secure the same in place. A suitable annular sealing member 54 may be recessed in part in the rear face of the respective end members 46 and 47 to seal the bore openings 49 and 52, respectively. The sight glass 12 for the gauge 43 communicates with the tank 44 through the respective bores 33, 28 and 51 at the upper end of the gauge and the bores 22, 52 and 51 at the lower end of the gauge to reflect the liquid level in the tank within the range of the gauge.

In the embodiment of FIG. 7, the gauge 55 is spaced from the tank 56 and supported by a single mounting stud 57. The mounting stud 57 is threaded at both ends to respectively engage within the threaded opening 58 in the tank 56 and the bore opening 52 of the lower end member 47 of the gauge 55. The stud 57 is hollow having a through bore 59 such that the sight glass 12 of gauge 55 communicates with the tank 56 through the bores 22, 52 and 59. A suitable annular sealing member 60 is recessed in part in the rear face of end member 47 to seal the bore opening 52.

The channel member 17 of gauge 55 connects the end members 61 and 47 similarly as in the previously embodiments of FIGS. 1–6, and the sight glass 12 is inserted during installation through the vertical threaded bore 62 of end member 61 with the lower end of the sight glass being seated in the annular recess 23. The end cap 63 is threaded into the vertical bore 62 to close the upper end of the guard enclosure 64 and engage the upper end of the sight glass 12 to secure the latter within the enclosure. Lacking a second connection to the tank 56, a vent passage 65 is provided in the end cap 63 so that the gauge 55 will reflect the liquid level in the tank.

A liquid level gauge according to this invention can be produced to sell at a reasonable price. Such a gauge can be made to any specified length, presents a pleasing appearance and is installed with relative ease.

Various modes of carrying out the invention are contemplated as being within the scope of the following claims particularly pointing out and distinctly claiming the subject matter which is regarded as the invention.

I claim:

1. In a gauge for indicating the liquid level in a container, a pair of vertically spaced and aligned hollow end members, a channel-shaped member extending between the end members with the channel recess facing forwardly, the upper end member being inwardly stepped to form a downwardly facing shoulder and a lower portion of reduced transverse section, the lower end member being inwardly stepped to form an upwardly facing shoulder and an upper portion of reduced transverse section, the adjacent reduced portions of the respective end members having a transverse dimension generally corresponding to the transverse dimension of the channel recess, said portions of the end members being disposed in the recess at the corresponding ends of the channel-shaped member with the ends of said member abutting the corresponding end member shoulders, means fixedly securing said portions of the respective end members to the channel-shaped member to form an integral gauge body, a tubular sight glass disposed in the channel recess between the end members and communicating with said end members, and means for mounting the gauge onto a container and placing the liquid contents of the container in communication with at least one of the end members and hence with the sight glass.

2. The invention as set forth in claim 1, wherein the portions of the respective end members disposed in the recess of the channel-shaped member are generally rectangular in section and wherein weld means secure said portions of the end members to the channel-shaped member.

3. The invention as set forth in claim 1, wherein at least one of said end members includes a vertical bore of a diameter sufficiently large to receive the tubular sight glass, and sleeve means for sealingly securing the sight glass within the sight glass enclosure.

4. The invention as set forth in claim 1, wherein the upper end member includes a vertical bore of a diameter sufficiently large to pass the tubular sight glass and the lower end member includes an upwardly opening recess adapted to sealingly support the lower end of the sight glass, and sleeve means engageable within the vertical bore of the upper end member to sealingly secure the upper end of the sight glass.

5. The invention as set forth in claim 1, wherein the respective end members are provided with a horizontally extending bore and wherein the gauge mounting means comprise hollow threaded members disposed within the horizontally extending bores of said end members, said hollow threaded members projecting from their respective bores and being adapted for securement to a container.

6. In a gauge for indicating the liquid level in a container, a pair of vertically spaced and aligned hollow end members having generally similar rectangular section presenting forward, rear and opposed side faces, the upper end member being inwardly stepped on at least the rear and the opposed side faces to form a downwardly facing shoulder and a lower portion of reduced section, the lower end member being inwardly stepped on at least the rear and the opposed side faces to form an upwardly facing shoulder and upper portion of reduced section, the shoulders and portions of reduced section on the respective end members being of generally similar dimension and generally aligned, a channel-shaped member extending between the end members with the channel recess facing forwardly, said channel recess corresponding in width to that of the end member portions of reduced section with said recess receiving said reduced portions and with the respective ends of the channel-shaped member abutting the corresponding end member shoulders, said channel-shaped member having a stock thickness generally corresponding to the depth of the end member shoulders to provide the gauge with generally smooth and continuous rear and opposed side surfaces, weld means securing the respective end members to the channel-shaped member, a tubular sight glass disposed in the channel recess between the end members and communicating with said end members, and means for mounting the gauge onto a container and placing the container contents in communication with at least one of the end members and hence with the sight glass.

References Cited

UNITED STATES PATENTS

| | | | |
|---|---|---|---|
| 1,570,938 | 1/1926 | Butler et al. | 73—292 |
| 2,620,663 | 12/1952 | Fine | 73—325 |
| 3,154,945 | 11/1964 | Busillo | 73—328 |
| 3,212,334 | 10/1965 | Conlon | 73—326 |
| 3,358,510 | 12/1967 | Hoffmann et al. | 73—329 |

FOREIGN PATENTS

| | | |
|---|---|---|
| 129,347 | 10/1948 | Australia. |

LOUIS R. PRINCE, Primary Examiner

D. M. YASICH, Assistant Examiner